(12) United States Patent
Sylvester et al.

(10) Patent No.: US 7,555,685 B2
(45) Date of Patent: Jun. 30, 2009

(54) METHOD AND APPARATUS FOR MONITORING BIT-ERROR RATE

(75) Inventors: James E. Sylvester, McLean, VA (US); Alexander Laparidis, Mansfield, MA (US); Stanley Y. Lee, Framingham, MA (US); Muzaffer Kanaan, Watertown, MA (US)

(73) Assignees: Verizon Services Corp., Arlington, VA (US); Verizon Services Organization Inc., Irving, TX (US)

( * ) Notice: Subject to any disclaimer, the term of this patent is extended or adjusted under 35 U.S.C. 154(b) by 407 days.

(21) Appl. No.: 11/602,349

(22) Filed: Nov. 21, 2006

(65) Prior Publication Data

US 2008/0120524 A1    May 22, 2008

(51) Int. Cl.
*G06F 11/00* (2006.01)
*H04L 12/26* (2006.01)
(52) U.S. Cl. .................... 714/704; 714/738; 370/252
(58) Field of Classification Search ............. None
See application file for complete search history.

(56) References Cited

U.S. PATENT DOCUMENTS

| 6,289,381 | B1 * | 9/2001 | Brodigan | 709/225 |
| 2005/0162172 | A1 * | 7/2005 | Bertness | 324/426 |
| 2007/0288822 | A1 * | 12/2007 | Lin et al. | 714/741 |

* cited by examiner

*Primary Examiner*—Christine T Tu

(57) ABSTRACT

A test set for evaluating network performance is described, and which may include an output device, a processor, a power supply, a memory unit, and a control terminal. The test set may be configured to receive a user-entered selection of one of a plurality of different bit-error rate profiles and generate a test signal exhibiting the selected bit-error rate profile. The test set may also supply the test signal exhibiting the selected bit-error rate profile to a network under test. In addition, the test set may receive as an input, an output from the network under test. The output may include the test signal exhibiting the selected bit-error rate. The test set may evaluate the received test signal and determine the performance of the network in response to the received test signal exhibiting the bit-error rate. The test set may then output the results of the evaluation.

22 Claims, 12 Drawing Sheets

METHOD AND APPARATUS FOR MONITORING BIT-ERROR RATE

BACKGROUND

When evaluating the performance of optical transport networks, it is often necessary to monitor the bit-error rate ("BER") and its implications on offering a given network service. The BER is the number of bit errors occurring within a specified time interval. For example, BER can be expressed by the equation:

$$BER=N/T,$$

where N is the number of bit errors and T is the time interval.

In practice, however, there are no universally agreed-upon values for the parameters, N and T. Different network test platforms may monitor the BER using different values, which makes it difficult to consistently monitor the BER. To make reliable measurements of system performance (such as protection switching times), it is necessary for the test platforms to be flexible enough so that they can monitor the BER over a wide range of values of N and T. Presently, no test platforms incorporate the flexibility to monitor the BER over a wide range of values for N and T.

When evaluating the suitability of a platform for a given application (such as video transport, or other data transport applications) it might be necessary to generate a BER with a given combination of values for N and T. The distribution of total bit errors N over the extent of period T, is referred to as the BER profile. The ability to generate a specific BER profile is especially critical for systems that employ forward error correction ("FEC"). All FEC techniques have limitations in the maximum number of contiguous bit errors they can correct. For example, suppose a particular FEC algorithm is known to operate reliably under a BER of $10^{-6}$ (1 error in 1 million bits). Given two profiles with the same number of bit errors over the same time interval, the FEC algorithm may be perfectly capable of correcting bit errors for one BER profile, but not another profile. FIGS. 1 and 2 illustrate two different BER profiles with the same total number of bit errors (N) over the same time interval (T) but with different error distributions over the time interval. A particular FEC algorithm may be able to correct errors for the profile shown in FIG. 1, but may not be able to correct the errors for the BER profile shown in FIG. 2. This is a substantial problem for downstream end-customers. For example, in the case of video transmission, an uncorrectable, rapid burst of a relatively small number of errors would result in video quality degradations such as tiling.

DETAILED DESCRIPTION

Embodiments consistent with the present invention may be implemented in a test set configured to generate and output a test signal including a selected bit-error rate ("BER") profile. In some embodiments consistent with the present invention, the test set may also evaluate network performance in response to a selected BER profile supplied to a network under test ("NUT"). For example, to evaluate the robustness of a forward error correcting ("FEC") algorithm, the test set may generate bit errors in accordance with a selected BER profile. Embodiments consistent with the present invention may allow the test set to generate not just a test signal (such as a bitstream) with a constant number of bit errors over an entire time interval, but also a unique BER profile. Depending on the characteristics of the optical link between the network elements and the particular data transport standard under consideration (e.g. SONET, SDH, etc.), some of the common BER profiles may be preprogrammed. In addition, embodiments consistent with the present invention may be implemented with non-optical data transport networks, such as electrical and wireless networks.

Figure 3:
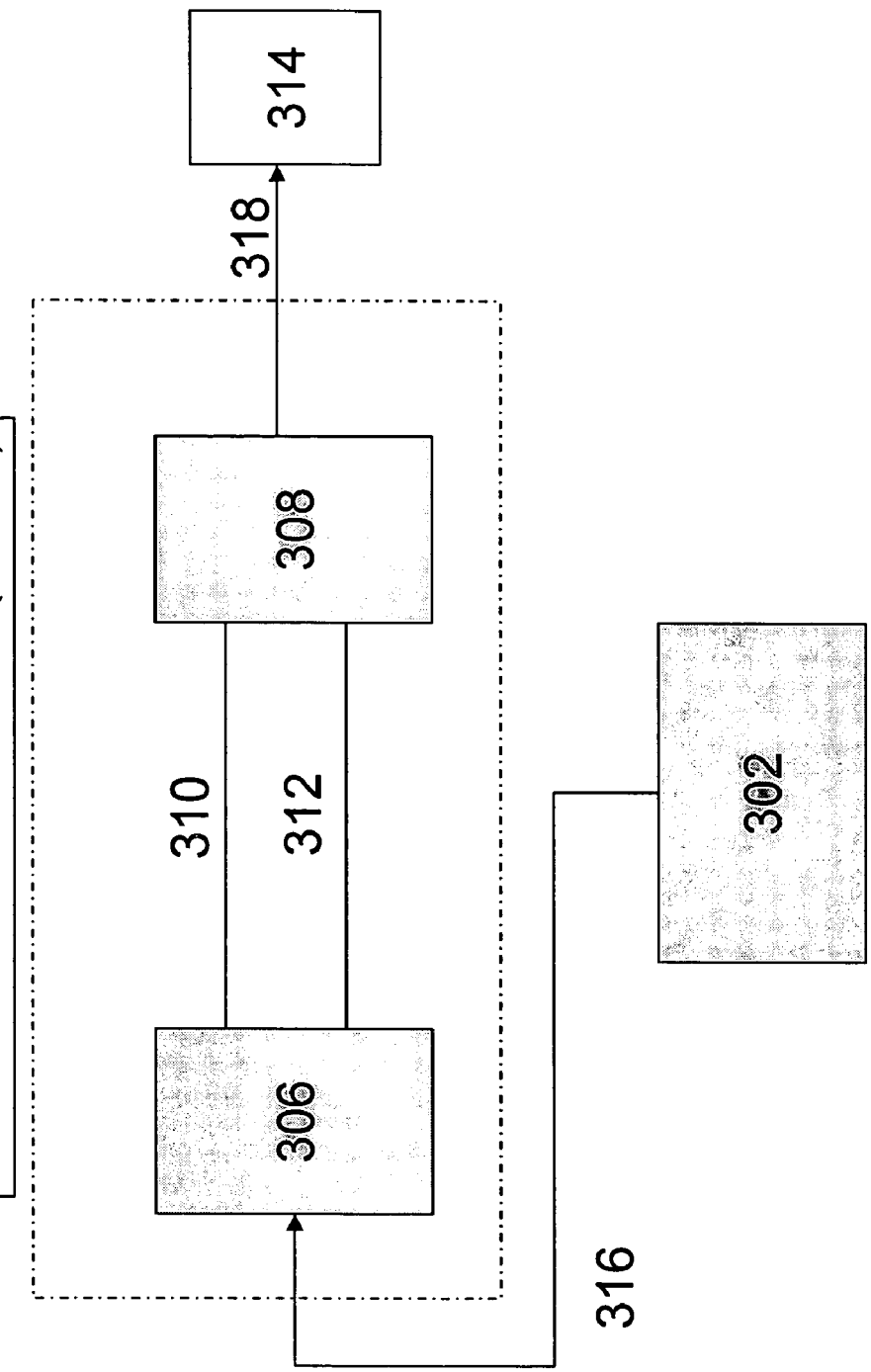
FIG. 3 is a block diagram representation of a network under test and test set consistent with a first exemplary embodiment.

As shown in FIG. 3, one embodiment consistent with the present invention includes a system 300 that comprises: a test set 302 (which may output a test signal including a user-selected BER profile); a monitoring unit 314; and a NUT 304. The NUT 304 may include networks element 306 and 308, and two optically protected lines, 310 and 312. Optically protected line 310 may be a "protect" line and optically protected line 312 may be a "working" line. The NUT 304 in FIG. 3 is preferably an optical transport network, and includes two network elements, but may include other, or additional network components. Examples of other network components include, but are not limited to, SONET/SDH add-drop multiplexers, dense wave division multiplexing ("DWDM") terminals, multi-service provisioning platforms ("MSPPs"), and multi-function access devices ("MFADs").

In this configuration, test set 302 is connected to NUT 304 via an optical connection line 316. However, communication between test set 302 and NUT 304 is not limited to optical transmission lines, and may be performed by any suitable means including, but not limited to, electrical communication such as DS-1/Ds-3 or 10/100/1000 Gbps Ethernet and wireless communication.

Test set 302 may also be connected directly to NUT 304. FIG. 3 shows the output of NUT 304 connected to monitoring unit 314 via connection line 318. Like connection line 316, connection line 318 is an optical transmission line, but it is not limited to optical transmission lines. Monitoring unit 314 may, however, communicate with NUT 304 by any suitable means as is known. In addition, monitoring unit 314 may also be connected directly to NUT 304.

Monitoring unit 314 may receive performance information from the output of NUT 304, evaluate the performance of NUT 304 in response to the test signal exhibiting the selected BER profile supplied to NUT 304, and output results of the evaluation. Performance information may indicate how NUT 304 performs in response to a supplied test signal exhibiting the selected one of a plurality of BER profiles. For instance, system performance information can be application specific and may indicate how an error correction algorithm executed by NUT 304 performs in response the selected BER profile. System performance information may represent the number of errored frames for a video transport application or the number of errored or dropped packets for any other data transport application.

Figure 4:
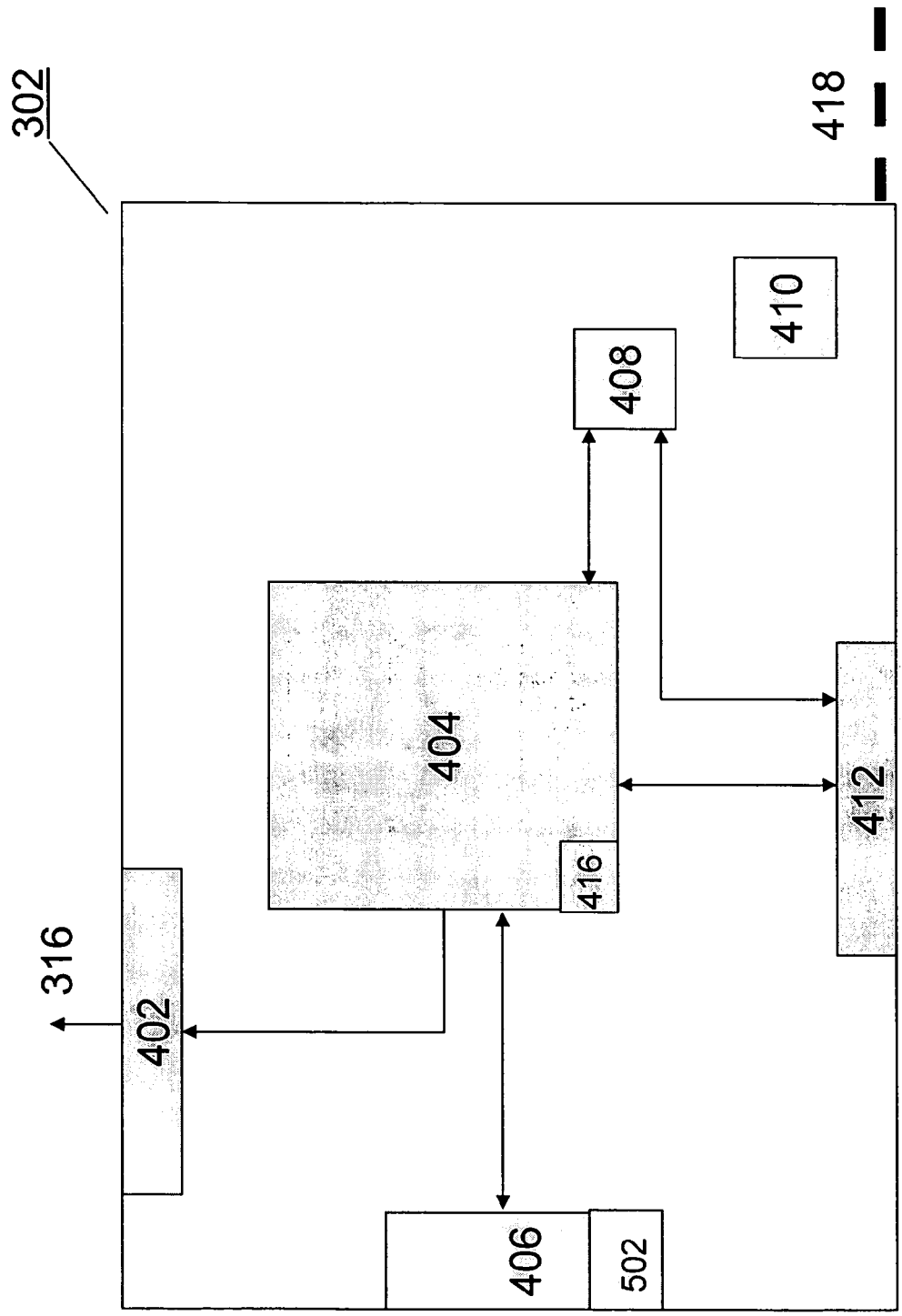
FIG. 4 is a block diagram representation of an exemplary test set consistent with the first embodiment.

FIG. 4 shows a more detailed representation of test set 302. Test set 302 may include an output device 402, a processor 404, a power supply 410, a memory unit 408, and a control terminal 406. Test set 302 may also include an input device 412, which may be used to load BER profiles. Test set 302 may also be configured to receive power from an external power supply 418. Control terminal 406 may include a display 502 configured to display the results of the network performance evaluation.

In FIG. 4, output device 402 is connected to connection line 316, but it may be connected to any suitable means for communicating with NUT 304. Output device 402 may also be configured to connect directly to NUT 304. Output device 402 may be, for example, an output port.

Power supply 410 may be a direct current power supply that supplies DC power to the components in test set 302 (connections not shown). Power supply 410 may take the form of batteries, rechargeable batteries, or any other appropriate dc power supply as is well known. Optional external power supply 418 may be connected to test set 302 by any suitable means as is well known, such as a power cord. External power supply 418 may supply either AC or DC power to test set 302. Furthermore, external power supply 418 may replace power supply 410, or may be used to supplement or complement the output of power supply 410.

Memory unit 408 may be connected to processor 404 and input device 412. Memory unit 408 may, however, be connected only to processor 404 or only to input device 412. Memory unit 408 may be any appropriate type of memory component, including, for example, ROM, PROM, RAM, EEPROM, Flash, etc. Memory unit 408 may store a plurality of different BER profiles. BER profiles may be input into memory unit 408 by processor 404, input device 412, or both. BER profiles may also be preloaded into memory unit 408 before assembly of test set 302. Memory unit 408 may include a removable module so that BER profiles can be loaded into test set 302 by substituting a different memory component.

Input device 412 may be connected to memory unit 408 and processor 404. Alternatively input device 412 may be connected only to memory unit 408 or only to processor 404. Input device 412 is configured to receive BER profiles uploaded from any suitable BER profile uploading device. For example, input device 412 may be configured as a parallel port, serial port, JTAG, etc. BER profiles may be sent from input device 412 to processor 404, memory unit 408, or both, depending on the configuration of test set 302.

Processor 404 may be connected to output device 402, input device 412, memory unit 408, control terminal 406, and power supply 410 (connections not shown). Processor 404 may also be connected to external power supply 418, if external power supply 418 is implemented. Processor 404 may include internal memory 416, which may be used to store at least one BER profile. Processor 404 may receive and process a user's selection of one of a plurality of different BER profiles selected via control terminal 406; generate and supply a test signal exhibiting the selected BER profile to output device 402; retrieve BER profiles from internal memory 416, memory unit 408, or both, based on the user's selection; supply a test signal exhibiting the selected stored BER profile to output device 402; receive BER profiles from input device 422; and send BER profiles to memory unit 408 or its own internal memory 416.

Control terminal 406 may be connected to processor 404. Control terminal 406 may be used to select one of a plurality of different BER profiles. Control terminal 406 may receive user inputs to select one of a plurality of different BER profiles by setting constant values for the number of bit errors (N) and the time interval (T). Control terminal 406 may also receive user inputs to select one of a plurality of different BER profiles by selecting a BER profile stored in either the processor's 404 internal memory 416 or memory unit 408.

Control terminal 406 may receive a user's input to change the selected BER profile to another, different BER profile. Control terminal 406 may be configured with any appropriate means as is well known for information input, such as knobs, buttons, an LCD screen accepting user input, or a wireless sensor.

Figure 5:
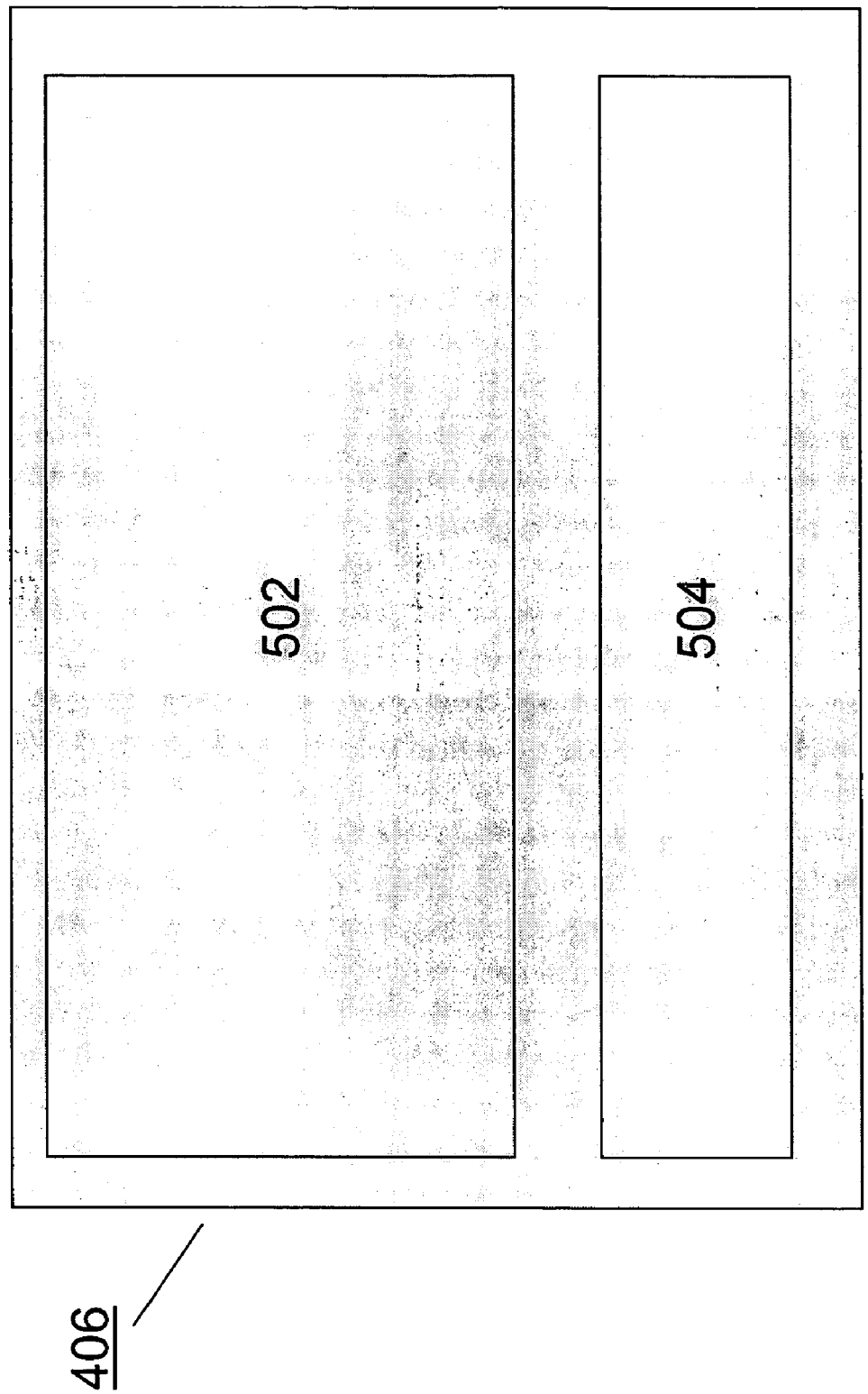
FIG. 5 is a block diagram representation of an exemplary control terminal consistent with the first embodiment.

FIG. 5 shows a representation of control terminal 406. Control terminal 406 may include a display 502 and a control panel 504. Display 502 may be any display, such as a liquid crystal display, CRT, etc. Display 502 may display any information relevant to the operation of test set 302, such as the user-selected values for N and T (if the user has input such values), the selected stored BER profile, or a list of stored BER profiles for possible selection. The list may include graphic displays of BER profiles. Control panel 504 may allow the user to make selections, such as whether to enter values for N and T or to select a stored BER profile. Control panel 504 may receive a user's entries or selections to be made in any appropriate manner as is well known, such as a liquid crystal display recognizing user inputs, control knobs, buttons, etc.

Figure 6:
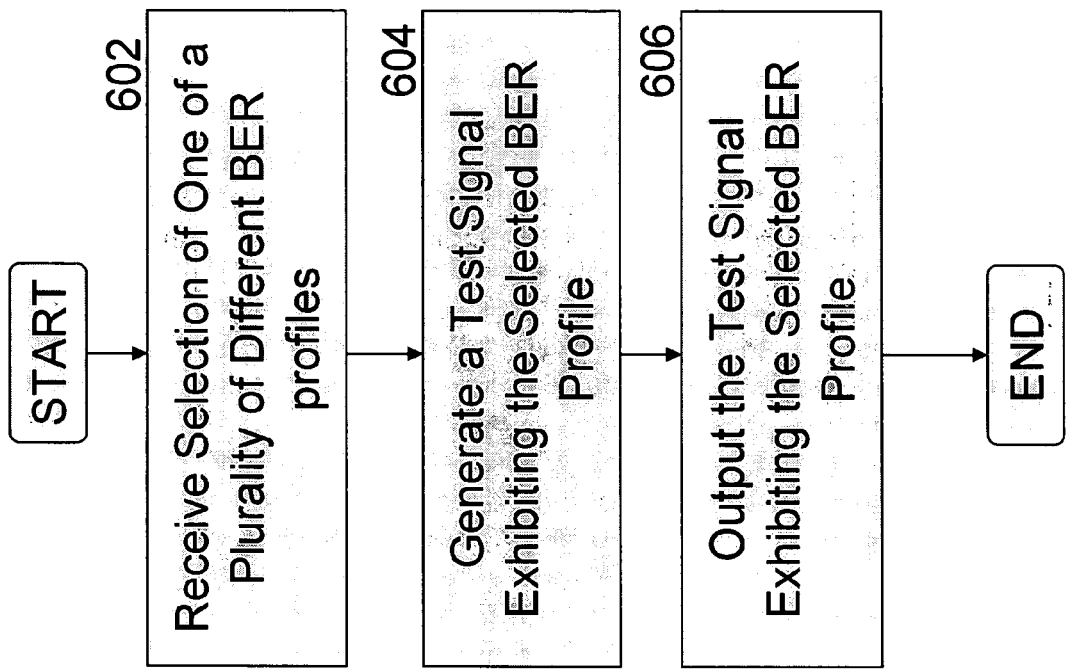
FIG. 6 is a flowchart illustrating an exemplary method consistent with the first embodiment.

FIG. 6 shows a flow chart depicting a process consistent with one exemplary embodiment. The process begins with step 602, where the system may accept a user-entered selection of one of a plurality of different BER profiles, using control terminal 406. Step 602 may include receiving selections of values for N and T, receiving selections of a BER profile from a plurality of stored BER profiles, or both. Next, in step 604, test set 302 may generate a test signal exhibiting the selected BER profile. In step 606, test set 302 may output the test signal exhibiting the selected BER profile.

Figure 7:
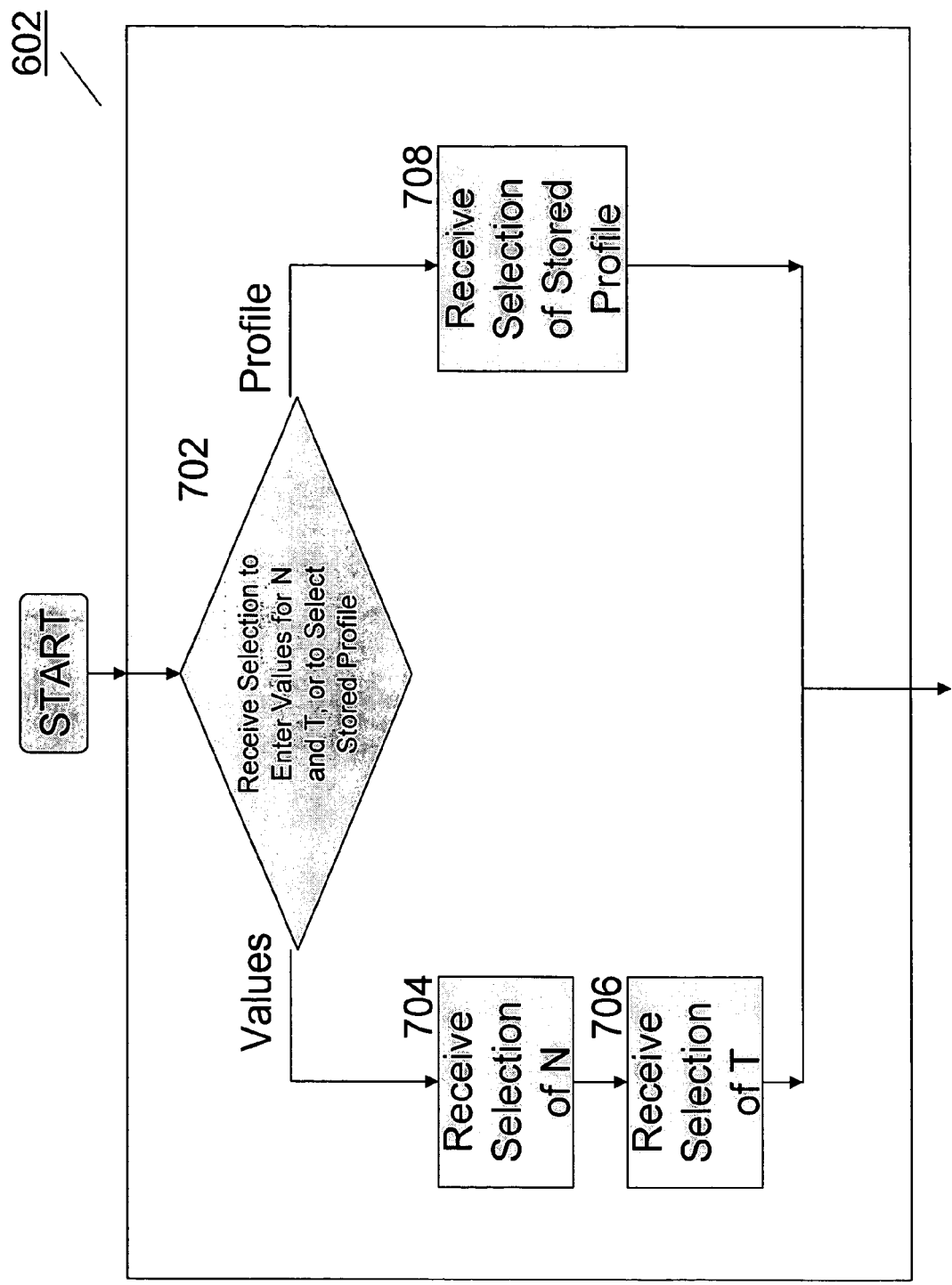
FIG. 7 is a flowchart illustrating block 602 from FIG. 6.

FIG. 7 illustrates more details of step 602 from FIG. 6, where the system may receive a user-entered selection of BER profiles by either receiving selections and entries of values for N and T or receiving selections of a BER profile from a plurality of stored BER profiles. In FIG. 7, step 602 may begin by receiving a user-entered selection. At step 702, the system may receive a user's choice of either entering values for N and T or selecting a stored BER profile. Typically, control terminal 406 receives the user's choice. Display 502 may prompt the user to select how he or she wants to select a BER profile. If the system receives an input indicating that the user wants to enter values for N and T, control may proceed left from step 702 to step 704. At step 704, the system may receive selections or entries of values for N, and at step 706, the system may receive selections or entries for values of T. FIG. 7 shows N selected before T, but T may be selected before N. If the system receives an input indicating that the user wants to select a stored BER profile, control may proceed right from step 702 to step 708. At step 708, the system receives a user's selection of a stored BER profile stored in test set 302. Typically display 502 displays a menu of stored BER profiles available for the user to select. Once the system has received a selection for a BER profile, control may proceed to step 604 in FIG. 6.

Figure 8:
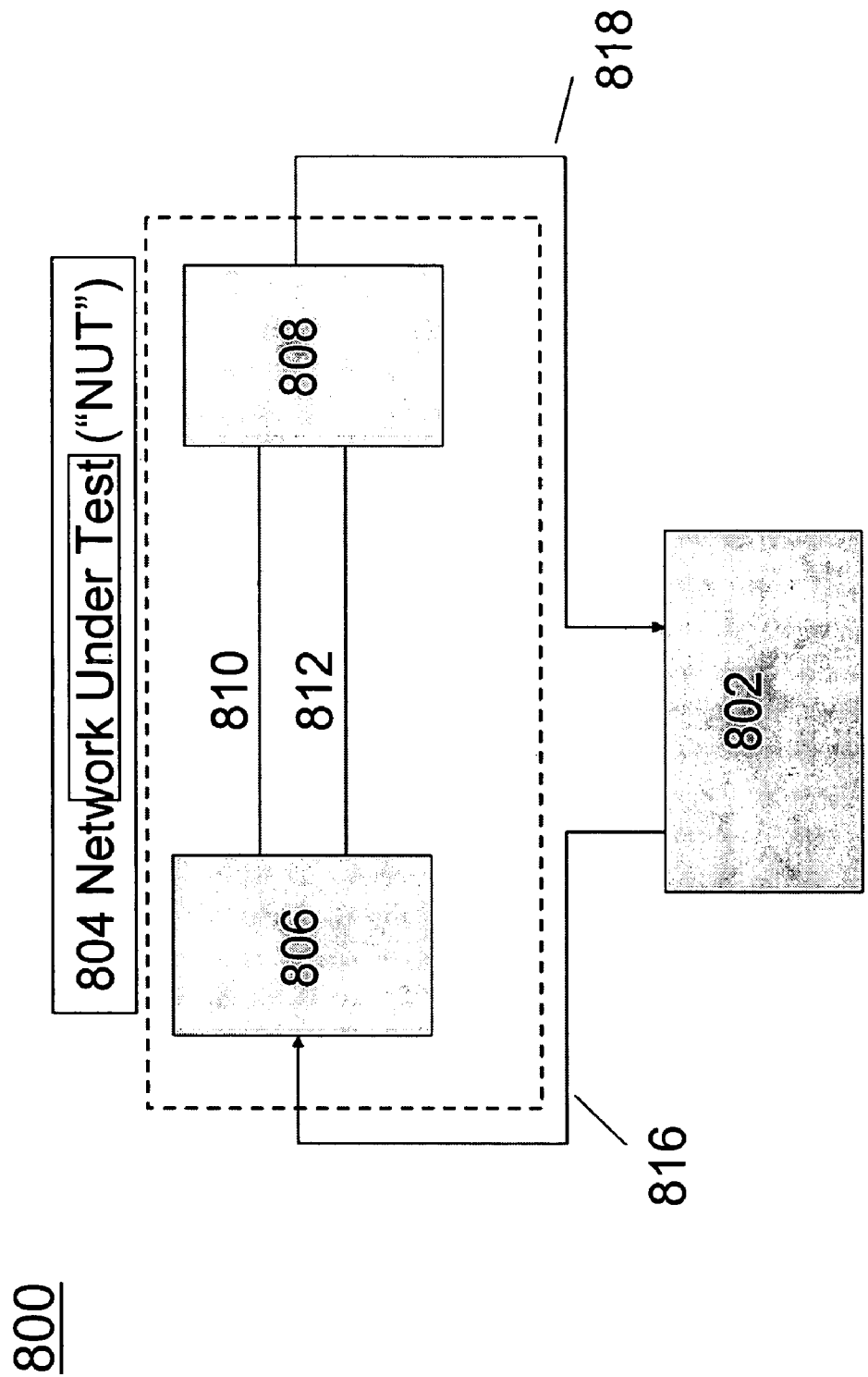
FIG. 8 is a block diagram representation of a network under test and test set consistent with a second exemplary embodiment.

FIG. 8 shows a system 800 consistent with a second exemplary embodiment. Test set 802 may also be connected to the output of NUT 804 via connection line 818. A separate monitoring unit is thus not necessary. The connection between the output of NUT 804 and test set 802 may be by any suitable means as described above in the first exemplary embodiment with respect to the connection between NUT 304 and monitoring unit 314.

Figure 9:
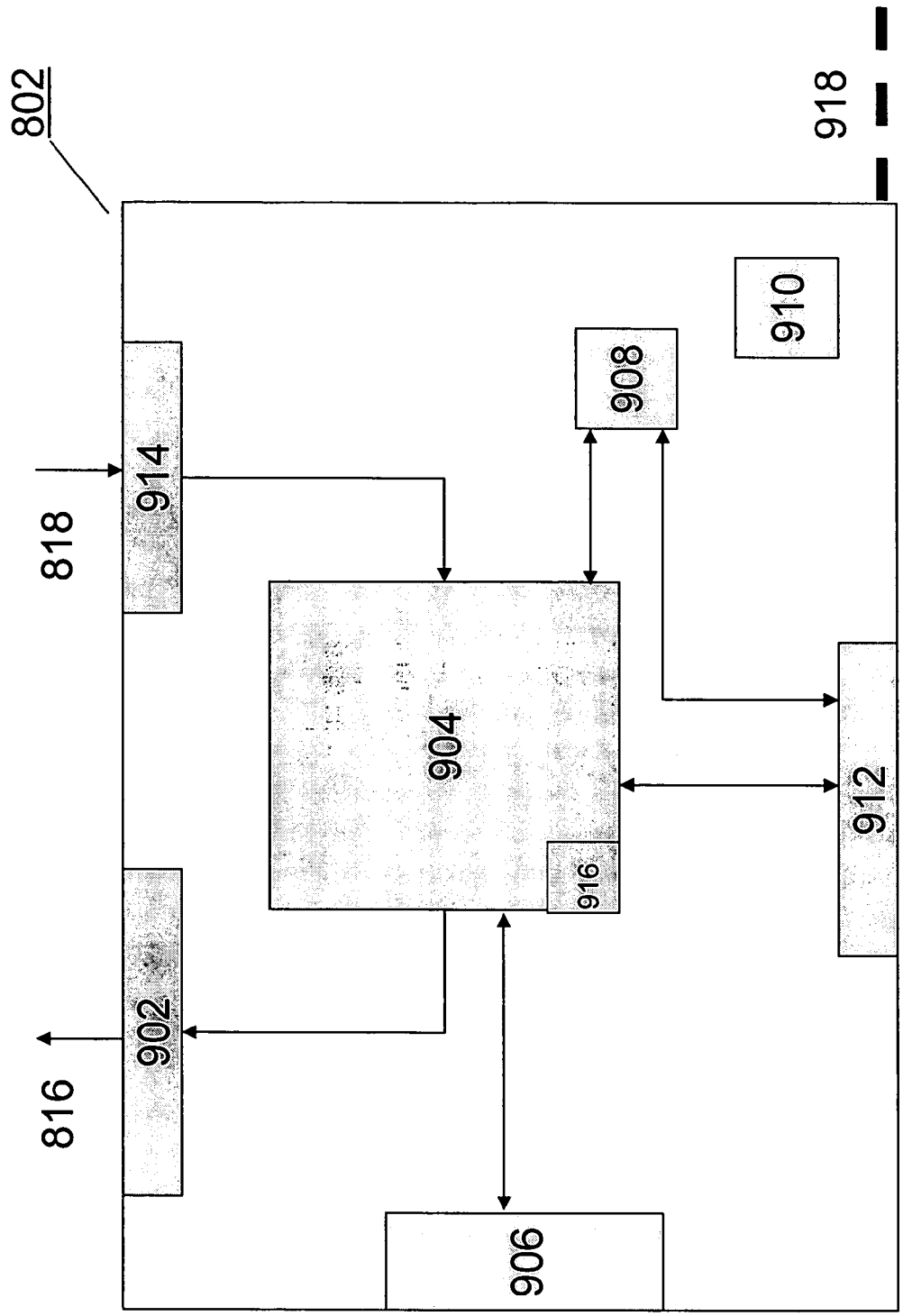
FIG. 9 is a block diagram representation of an exemplary control terminal consistent with the second embodiment.

FIG. 9 shows a more detailed representation of test set 802 configured in accordance with the second exemplary embodiment. Test set 802 may include an output device 902, a processor 904, a power supply 910, a memory unit 908, a control terminal 906, a first input device 912, and a second input device 914. In addition, control terminal 906 may be configured with a display and control terminal similar to those disclosed in the first preferred exemplary embodiment. Test set 802 may be configured similarly to the first preferred exemplary embodiment. Furthermore, unless described below, components commonly named in the first and second preferred exemplary embodiments may operate similarly.

Second input device 914 may be connected to processor 904. Second input 914 may receive as an input, output signals representing network performance information from an output of NUT 804, and supply the received performance information to processor 904. Processor 904 may receive the performance information evaluate the received performance information, and output results of the evaluation. Processor 904 preferably outputs results of the evaluation to control terminal 906.

Figure 10:
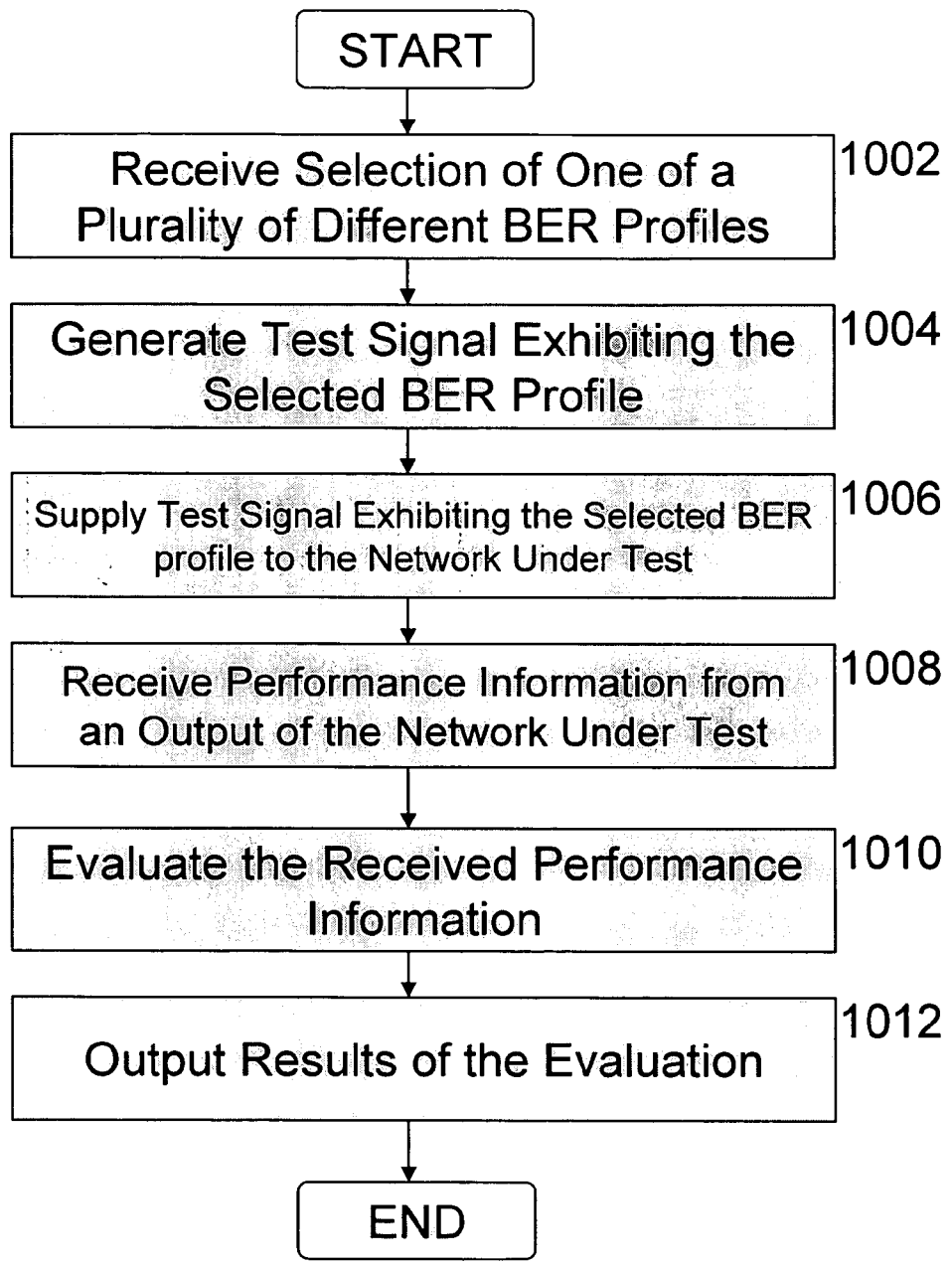
FIG. 10 is a flowchart illustrating an exemplary method consistent with the second embodiment.

FIG. 10 is a flow chart depicting a process consistent with the second exemplary embodiment. The process begins with step 1002, where the system may receive a selection one of a plurality of different BER profiles using control terminal 906. Specifically, at step 1002, the system may receive selections of values for N and T, receive selections of a stored BER profile, or both. Next, in step 1004, test set 802 may generate a test signal exhibiting the selected BER profile. At step 1006, test set 802 may supply the test signal exhibiting the selected BER profile to NUT 804. At step 1008, test set 802 may receive performance information from an output of NUT 804. Test set 802 may then evaluate the received performance information to determine network performance at step 1010. At step 1012, test set 802 may output results of the evaluation. Preferably the results are output to control terminal 904.

Figure 11:
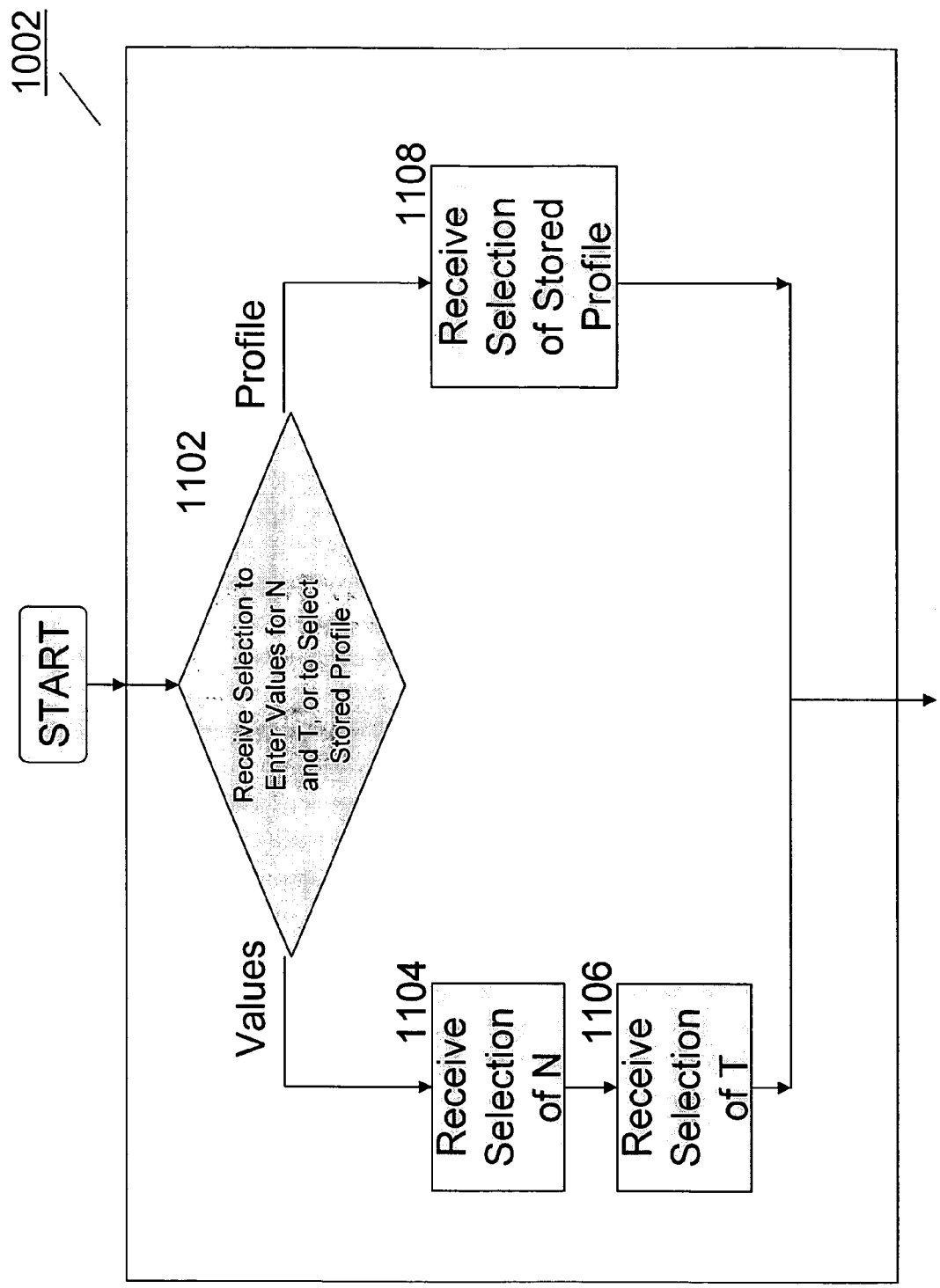
FIG. 11 is a flowchart illustrating block 1002 from FIG. 10.

FIG. 11 represents more details from step 1002 from FIG. 10, where the system may receive a user-entered selection of BER profiles by either receiving selections and entries of values for N and T or selections of a BER profile from a plurality of stored BER profiles. In FIG. 11, step 1002 may begin by receiving a user-entered selection. At step 1102, the system may receive a user's choice to either enter values for N and T or select a stored BER profile. Typically, control terminal 906 receives the user's choice. A display, that may be the same as the one shown in FIG. 5, may prompt the user to select how he or she wants to select a BER profile. If the system receives an input indicating that the user wants to enter values for N and T, control may proceed left from step 1102 to step 1104. At step 1104, the system may receive selections or entries of values for N, and at step 1106, the system may receive selections or entries of values for T. FIG. 11 shows N selected before T, but T may be selected before N. If the system receives an input indicating that the user wants to select a stored BER profile, control may proceed right from step 1102 to step 1108. At step 1108, the system receives a user's selection of a stored BER profile stored in test set 802. Typically a display, that may the same as the one shown in FIG. 5, may display a menu of stored BER profiles available for the user to select. Once the system has received a selection for a BER profile, control may then proceed to step 1004 in FIG. 10. Although the exemplary embodiments describe specification of receiving a user-entered selection of BER profiles by receiving either selections and entries of values for N and T or selections of a BER profile from pre-stored BER profiles, embodiments may be configured to allow a user to create a custom BER profile by specifying different values for N over subintervals t over a given time interval T.

Figure 1:
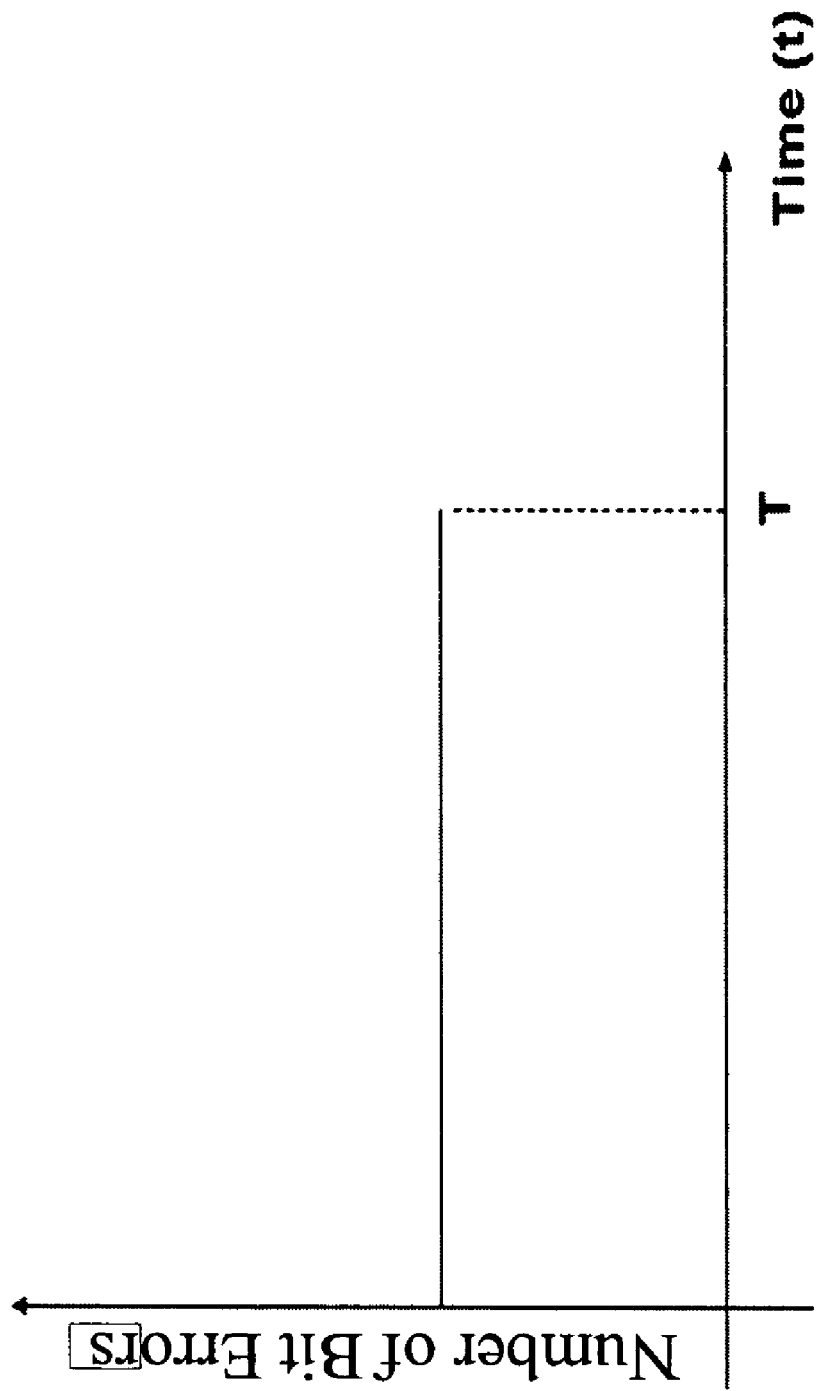
FIG. 1 is a representation of a BER profile, showing distributions of errors (N) over a time interval (T).
Figure 2:
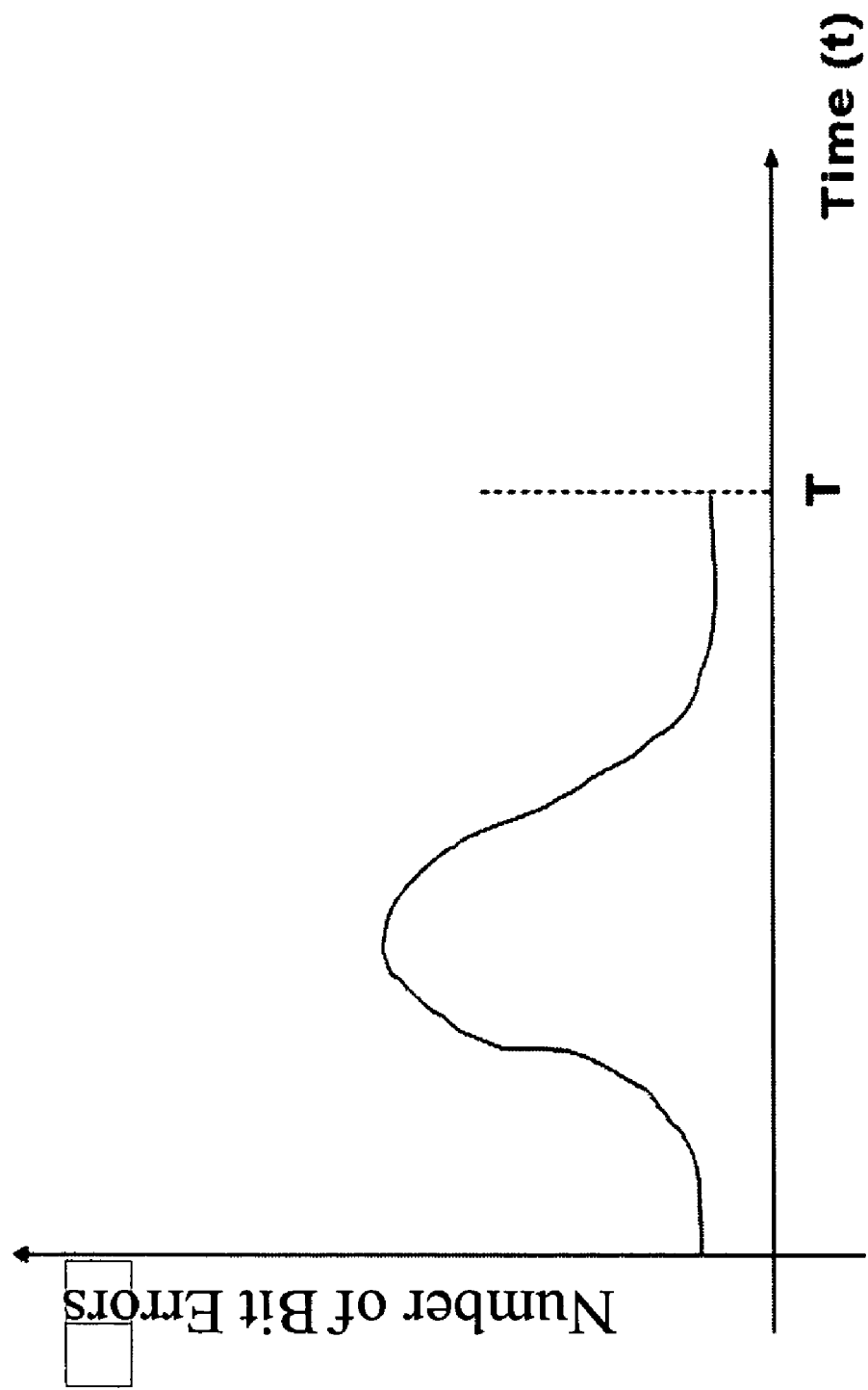
FIG. 2 is a graphical representation of a BER profile different from the profile of FIG. 1, also showing a different distribution of errors (N) over the time interval (T).
Figure 12:
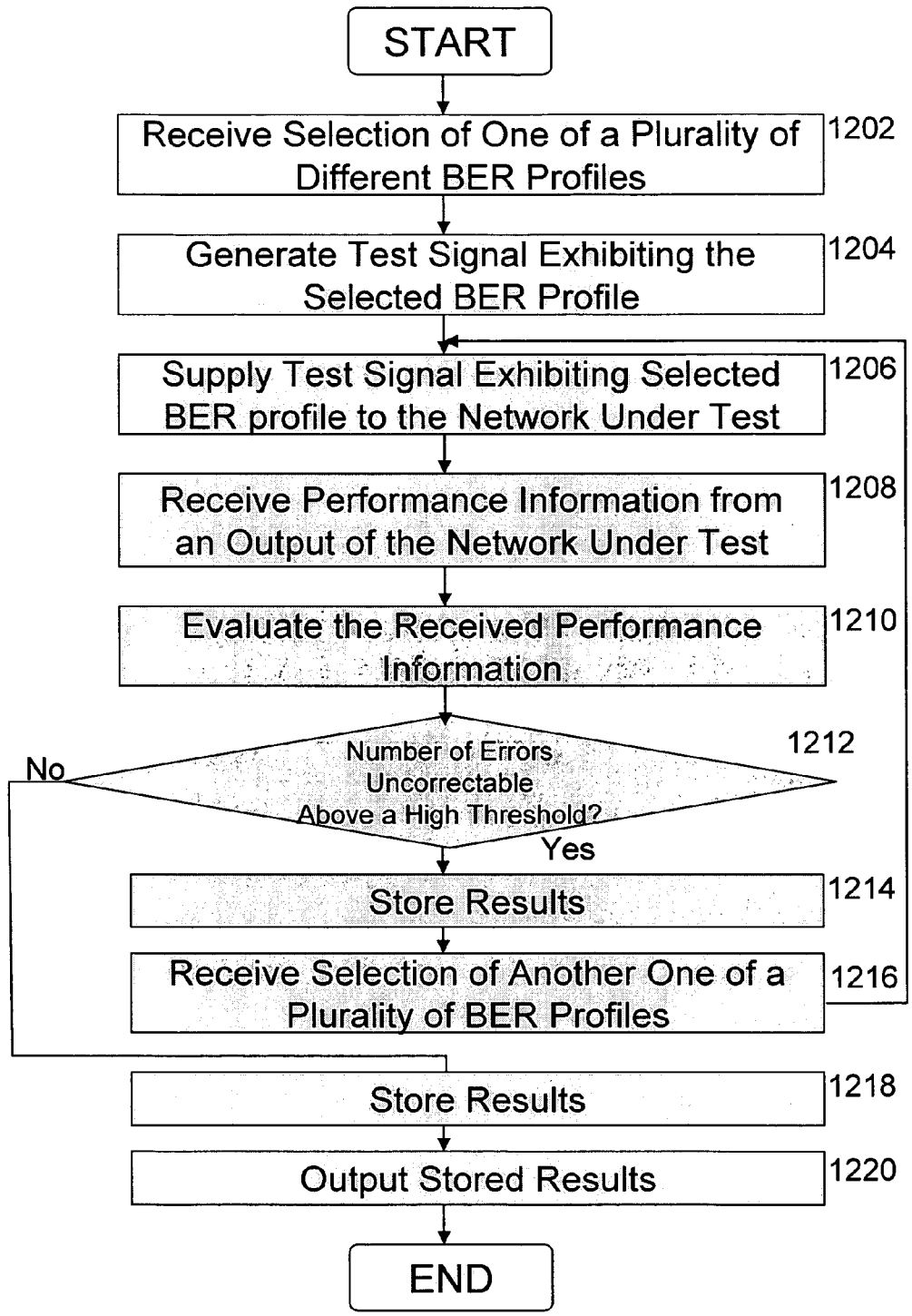
FIG. 12 is a flow chart illustrating of an exemplary method consistent with a third embodiment.

FIG. 12 is a flow chart of a method representative of a third exemplary embodiment consistent with the invention. The method shown in FIG. 12 may be performed on NUT 804 by test set 802 from the second preferred exemplary embodiment. NUT 804 may execute a specific error correcting algorithm. The error correcting algorithm may be known to operate reliably (i.e., correct a certain number of errors) under a certain BER. The error correcting algorithm may however, not be able to operate reliably for different profiles with the certain BER. For example, referring again to FIGS. 1 and 2, these figures show two examples of BER profiles that may have the same number of bit errors (N) over the same time interval (T), but with different combinations of, N and T, and also different variations of the bit errors as a function of time. In this example, the error correcting algorithm may operate reliably for the BER profile in FIG. 1, but not for the BER profile in FIG. 2.

In FIG. 12, steps 1202 through 1208 may be the same as steps 1002 through 1008 in FIG. 10. From step 1208, control may proceed to step 1210. In step 1210, the system may evaluate the received test signal to determine the numbers of bit errors in the received test signal. At step 1212, processor 904 may determine whether the numbers of bit errors exceeds a predetermined threshold (i.e., the error correcting algorithm executed by NUT 804 cannot correct a specified number of bit errors). If the system determines that the test signal exhibits numbers of bit errors exceeding the predetermined threshold, control may proceed to step 1214. At step 1214, the system may store the parameters of the supplied BER profile and an indication of the determination in memory. Parameters may be the values for N and T, including variations of N as a function of time. The indication may represent whether the error correction algorithm performed satisfactorily in response to the test signal exhibiting the selected BER profile. The parameters and indication of the determination may be collectively known as "results." "Results" include, but are not limited to, a pass/fail indication or indications and observed BER versus expected range for the test to pass.

Control may then proceed to step 1216. At step 1216, test set 802 may receive a selection of a BER profile different than the most recently selected BER profile. Preferably control terminal 906 receives a user's entry to select a different BER profile. Alternatively, processor 904 may select the BER profile by receiving and executing preloaded instructions. The preloaded instructions may take the form of a computer program. The program may be written in any appropriate computer programming language. Once test set 802 receives an input to select a different profile, control may proceed back to step 1206.

If however, the system determines that the test signal exhibits numbers of bit errors that do not exceed the predetermined threshold, control may proceed to step 1218. At step 1218, the system may store parameters of the supplied BER profile and an indication of the determination. Parameters may be the values for N and T, including variations of N as a function of time. The indication may represent whether the error correction algorithm performed satisfactorily in response to the test signal exhibiting the selected BER profile. The parameters and indication of the determination may be collectively known as "results." Control may then proceed to step 1220. At step 1220, test set 802 may output stored results. Test set 802 may output stored results to control terminal 906.

In the preceding specification, specific exemplary embodiments have been described with reference to specific implementations thereof. It will, however, be evident that various modifications and changes may be made thereunto, and additional embodiments may be implemented, without departing from the broader spirit and scope of the invention as set forth in the claims that follow. The specification and drawings are accordingly to be regarded in an illustrative rather than restrictive sense.

What is claimed is:

1. A method comprising:
    receiving a selection of one of a plurality of different profiles, the profiles representative of numbers of bit errors as functions of time;
    generating a test signal exhibiting the selected profile;
    supplying the test signal exhibiting the selected profile to a network under test;
    receiving performance information for the supplied test signal from the network under test;
    evaluating the received performance information; and
    outputting results of the evaluation.

2. The method according to claim 1, wherein receiving a selection of one of a plurality of different profiles comprises:
    receiving a selection to select the profile from a plurality of stored profiles.

3. The method according to claim 1, wherein receiving a selection of one of a plurality of different profiles comprises:
    receiving an input to select values for the number of bit errors and a time interval.

4. The method according to claim 1, wherein receiving, a selection of one of a plurality of different profiles comprises:
    receiving an input to decide whether to select the profile from a plurality of stored profiles or to select values for the number of bit errors and a time interval; and
    receiving one of a selection to select the profile from a plurality of stored profiles or an input to select values for the number of bit errors and a time interval.

5. The method according to claim 1, wherein the network under test is any one of an optical transport network, an electrical transport network, and a wireless transport network.

6. The method according to claim 1, wherein results of the evaluation indicate the performance of the network under test in response to the supplied test signal including the selected profile.

7. The method according to claim 1, wherein results of the evaluation indicate the performance of an error correction algorithm in response to the supplied test signal exhibiting the selected profile.

8. The method according to claim 1, wherein the results of the evaluation indicate the performance of a forward error correction algorithm in response to the supplied test signal including the selected profile.

9. An apparatus comprising:
    a first input configured to receive a user-entered selection of one of a plurality of different profiles, the profiles representative of numbers of bit errors as functions of time;
    a first component configured to generate a test signal exhibiting the selected profile;
    a second component configured to supply the test signal including the selected profile to a network under test;
    a second input configured to receive network performance information from an output of the network under test;
    a processor configured to analyze and evaluate the received network performance information; and
    an output configured to output results of the evaluation.

10. The apparatus according to claim 9, wherein the one of a plurality of different profiles is selected from:
    a plurality of stored profiles.

11. The apparatus according to claim 9, wherein the one of a plurality of different profiles is selected by:
    inputting values for the number of bit errors and a time interval.

12. The apparatus according to claim 9, wherein the one of a plurality of different profiles is selected by receiving a choice of:
    from a plurality of stored profiles; or
    by inputting values for the number of bit errors and a time interval; and
    receiving the selection for the stored profile, or the selection values for the number of bit errors and the time interval.

13. The apparatus according to claim 9, wherein results of the evaluation indicate the performance of the network under test in response to the supplied test signal exhibiting the selected profile.

14. The apparatus according to claim 9, wherein results of the evaluation indicate the performance of an error correction algorithm in response to the supplied test signal exhibiting the selected profile.

15. The apparatus according to claim 9, wherein results of the evaluation indicate the performance of an forward error correction algorithm in response to the supplied test signal exhibiting the selected profile.

16. A method comprising:
    receiving a user-entered selection of one of a plurality of different profiles, the profiles representative of numbers of bit errors as functions of time;
    generating a test signal exhibiting the selected profile;
    supplying the test signal exhibiting the selected profile to a network under test;
    receiving the test signal from the network under test;
    determining whether the received test signal exhibits numbers of bit errors exceeding a predetermined threshold;
    storing parameters of the selected profile and an indication of the determination;
    selecting from the plurality of different profiles, if the determination indicates that numbers of bit errors from the selected profile exceed the predetermined threshold, a profile different from the previously selected profile; and
    repeating the supplying, receiving, determining, storing, and selecting steps until numbers of bit errors from the most recently selected profile do not exceed the predetermined threshold.

17. The method according to claim.16, wherein receiving a user-entered selection of one of a plurality of different profiles comprises:
    receiving a selection to select the profile from a plurality of stored profiles.

18. The method according to claim 16, wherein receiving a user-entered selection of one of a plurality of different profiles comprises:
    receiving an input to select values for the number of bit errors and a time interval.

19. The method according to claim 16, wherein receiving a user-entered selection of one of a plurality of different profiles comprises:
- receiving an input to decide whether to select the profile from a plurality of stored profiles or to select values for the number of bit errors and a time interval; and
- receiving one of a selection to select the profile from a plurality of stored profiles or an input to select values for the number of bit errors and a time interval.

20. An apparatus comprising,
- a first input configured to receive a user-entered selection of one of a plurality of different profiles, the profiles representative of numbers of bit errors as functions of time;
- a first component configured to generate a test signal exhibiting the selected profile;
- a second component configured to supply the test signal exhibiting the selected profile to a network under test;
- a second input configured to receive network performance information from an output of the network under test;
- a determining component configured to determine whether the received test signal exhibits numbers of bit errors exceeding a predetermined threshold;
- a memory component configured to store, as results, parameters of the selected profile and an indication of the determination;
- a selecting component configured to select from the plurality of different profiles, if the determination indicates that numbers of bit errors from the selected profile exceed the predetermined threshold, a profile different from the previously selected profile;
- a controller configured to determine when numbers of bit errors from the most recently selected profile do not exceed the predetermined threshold; and
- an output component configured to output the stored results.

21. The apparatus according to claim 20, wherein the one of a plurality of different profiles is selected from:
- a plurality of stored profiles.

22. The apparatus according to claim 21, wherein receiving a user-entered selection of one of a plurality of different profiles comprises:
- receiving an input to select values for the number of bit errors and a time interval.

* * * * *